United States Patent
van Niekerk et al.

(10) Patent No.: US 9,382,928 B2
(45) Date of Patent: Jul. 5, 2016

(54) COMPONENT CONNECTION AND A METHOD FOR CONNECTING TWO COMPONENTS

(71) Applicant: Bayerische Motoren Werke Aktiengesellschaft, Munich (DE)

(72) Inventors: Johann van Niekerk, Munich (DE); Michael Ahlers, Munich (DE); Maik Hammer, Eching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 204 days.

(21) Appl. No.: 14/082,653

(22) Filed: Nov. 18, 2013

(65) Prior Publication Data

US 2014/0201959 A1    Jul. 24, 2014

Related U.S. Application Data

(63) Continuation of application No. PCT/EP2012/060545, filed on Jun. 5, 2012.

(30) Foreign Application Priority Data

Jul. 20, 2011    (DE) .......................... 10 2011 079 483

(51) Int. Cl.
  *F16B 2/20* (2006.01)
  *F16B 5/06* (2006.01)
  *F16B 5/08* (2006.01)
  *F16B 11/00* (2006.01)

(52) U.S. Cl.
  CPC .................. *F16B 2/20* (2013.01); *F16B 5/0657* (2013.01); *F16B 5/08* (2013.01); *F16B 11/006* (2013.01); *Y10T 24/44* (2015.01)

(58) Field of Classification Search
  None
  See application file for complete search history.

(56) References Cited

U.S. PATENT DOCUMENTS

| 3,188,731 | A | | 6/1965 | Sweeney | |
|---|---|---|---|---|---|
| 4,878,792 | A | * | 11/1989 | Frano | ............................ 411/339 |
| 5,542,158 | A | | 8/1996 | Gronau et al. | |
| 5,580,204 | A | * | 12/1996 | Hultman | ....................... 411/509 |
| 5,771,650 | A | * | 6/1998 | Williams et al. | ................ 52/568 |
| 2004/0187289 | A1 | | 9/2004 | Toback | |
| 2010/0008746 | A1 | | 1/2010 | Degelis et al. | |
| 2011/0203081 | A1 | | 8/2011 | Iwahara et al. | |

FOREIGN PATENT DOCUMENTS

| CN | 101617132 A | 12/2009 |
|---|---|---|
| CN | 102084139 A | 6/2011 |

(Continued)

OTHER PUBLICATIONS

English translation of Chinese Office Action Nov. 2, 2014 (seven (7) pages).

(Continued)

*Primary Examiner* — Jack W Lavinder
(74) *Attorney, Agent, or Firm* — Crowell & Moring LLP

(57) ABSTRACT

A component connection arrangement and a method of connecting components is provided in which a first component having a projecting male fixing element is connected to a second component in a friction-locking manner by a sleeve-like or cap-like clip element snapped on the male fixing element, with the clip element being clamped between the male fixing element and a female fixing element provided on or in the second component.

21 Claims, 1 Drawing Sheet

(56) References Cited

FOREIGN PATENT DOCUMENTS

| DE | 1 251 087 B | 1/1959 |
|----|-------------|--------|
| DE | 197 39 350 A1 | 3/1999 |
| GB | 884123 A | 12/1961 |
| WO | WO 99/13231 A1 | 3/1999 |
| WO | WO 2011/029501 A1 | 3/2011 |

OTHER PUBLICATIONS

International Search Report dated Sep. 6, 2012 w/ English translation (six (6) pages).
German Office Action dated Jul. 11, 2012 w/ English translation (seven (7) pages).

* cited by examiner

COMPONENT CONNECTION AND A METHOD FOR CONNECTING TWO COMPONENTS

CROSS REFERENCE TO RELATED APPLICATIONS

This application is a continuation of PCT International Application No. PCT/EP2012/060545, filed Jun. 5, 2012 which claims priority under 35 U.S.C. §119 from German Patent Application No. DE 10 2011 079 483.2, filed Jul. 20, 2011, the entire disclosures of which are expressly incorporated by reference herein.

BACKGROUND AND SUMMARY Of THE INVENTION

The present invention relates to a component connection having a first component from which a male fixing element projects connected to a second component by a clip element attached to the male fixing element and clamped between the male fixing element and a female fixing element of the second component.

International patent publication WO 2011/029501 A1, which was also filed by the applicant, discloses a method for loosely prefixing two components that are to be firmly connected to each other. In this case a first of the two components has a positive-locking element, which projects from said first component; and a second of the two components has a second positive-locking element that interacts with the first positive-locking element. The two components are placed together in such a way that the two positive-locking elements interlock with one another. The first positive-locking element may be a sphere that is welded on the first component.

The object of the present invention is to provide a component connection and a method for connecting two components, such that said component connection and/or said method is and/or are suitable, in particular, for a dissimilar material construction, i.e. for joining together two components that are made of different materials.

The starting point of the invention is a component connection comprising a first component, from which a male fixing element projects, and a second component, which has a female fixing element, which is provided for receiving the male fixing element that is provided on the first component.

In contrast to the aforementioned WO 2001/029501 A1, the fixing elements of the present invention do not interact directly. In the present invention a sleeve-like or cap-like clip element is snapped on the male fixing element. When the two components are connected to each other or more specifically plugged together, the clip element, which is snapped on the male fixing element, is clamped between the male fixing element and the female fixing element that is provided on or in the second component. As a result, an inner face of the clip element rests against an outer face of the male fixing element. An outer face of the clip element rests against an inner face of the female fixing element. The sleeve-like or cap-like clip element allows the male fixing element, which is provided on the first component, to be connected to the second component in a friction-locking manner and/or in a positive-locking manner.

One significant advantage to be gained from such an arrangement is that the clip element can be constructed in such a way that the second component does not touch or more specifically does not make contact with the first component or rather the male fixing element that is provided on said first component. In particular, if the components are made of different materials, this design can reduce the risk of contact corrosion. Preferably the clip element should then be made of an electrically non-conductive material or an electrically poorly conductive material, such as a synthetic plastic material.

In order to achieve an adequate clamping force, the clip element should have an oversize with respect to the female fixing element. In so far as the components are to be connected to each other by the two fixing elements in such a way that said components cannot shift, the clip element should have an oversize in at least two directions, which are transverse to an insertion direction, is which the male fixing element is inserted into the female fixing element. This arrangement can be achieved, in particular, by circularly round fixing elements. As an alternative, the female fixing element could also be designed as an oblong hole, which would enable a relative displacement of the two components in a longitudinal direction of the oblong hole, whereas the two components are fixed relative to each other in directions transverse to the longitudinal direction of the oblong hole.

According to a further development of the invention, a profiling is provided on an outer periphery of the chip element. The profiling may be, for example, formed in the manner of a knurl or a tooth or in an other way. Such a profiling enhances the clamping ability of the clip element in and/or on the female fixing element.

Preferably the clip element should engage behind the first fixing element and, thus, produce a positive connection, when said clip element is snapped on the first fixing element, so that there is a slight amount of "self-locking" against an unintentional removal of the clip element from the male fixing element.

In order to enable the clip element, which is snapped on the male fixing element of the first component, to be inserted or rather plugged into the female fixing element, the clip element should have a slight capacity to deform elastically, and at least a slight capacity to deform plastically. It can be provided that the clip element is deformed elastically and/or plastically at least in one outer region when said clip element is inserted into the female fixing element.

Furthermore, it can be provided that the female fixing element of the second component engages behind the clip element in a positive-locking manner, interlocks with said clip element or snaps on said clip element.

Furthermore, it can be provided that the clip element is designed, in so far it is constructed in the manner of a cap, such that it totally covers the male fixing element and reaches directly up to a side of the first component that faces the second component or more specifically rests against said side of the first component. A clip element that is designed in such a manner makes it possible to prevent in a reliable way the second component from making contact with the male fixing element.

The male fixing element is constructed preferably in such a way that it is rotationally symmetrical relative to an insertion direction, in which it is inserted into the female fixing element. The male fixing element may have, in particular, totally or partially the shape of a sphere or totally or partially a shape similar to a sphere. It may be constructed, for example, as a spherical cap.

The male fixing element can be connected to the first component, for example, by material bonding or in any other way. For example, said male fixing element can be welded on the first component. Various welding methods may be considered, but laser welding is particularly suitable.

As stated above, the two components can be made of the same material or different materials. One of the two components, for example, the first component, may be, for example, a metal component, such as a sheet metal component. Especially suitable are steel or aluminum components, as they are used, for example, in the manufacture of vehicle bodies. The male fixing element can be made of the same material as the first component, for example, of steel or aluminum.

The second component can be made of a different material, for example, a synthetic plastic material. The invention lends itself especially well to "dissimilar material joints," for example, metal-to-plastic joints, two dissimilar metals, two dissimilar plastics, etc. Provider that one of the two components is made of plastic, it may be, in particular, a fiber-reinforced plastic component. Especially suitable are plastic components with a matrix of carbon or glass fiber elements. These fibers can be contained in the plastic in a finely dispersed manner or, for example, in the form of a non-woven fabric, a mat, a woven fabric, a knitted fabric or the like.

The component connection according to the invention can be used for "prefixing" two components, which are to be connected to each other by at least one additional component connection. Two components that are to be welded to each other can be prefixed relative to each other, for example, by the component connection according to the invention and then be (permanently) connected to each other by material bending, for example, by welding, adhesive cementing or in any other way.

The invention can be employed, in particular, in the manufacture of vehicle bodies. In this case the first and/or the second component can be, for example, a vehicle component, in particular a body component. However, it must be explicitly emphasized that the invention can also be used in a variety of applications in totally different technical fields.

In summary, its particular the following advantages can be achieved with the invention:

The invention enables a "cold," clean joining of two components.

The clip element can be used as an "isolator," which makes possible an electrolytic and/or electrical separation of the two components that are to be connected to each other.

The joining of the components is comparatively simple from a technological standpoint and, therefore, can be easily automated.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
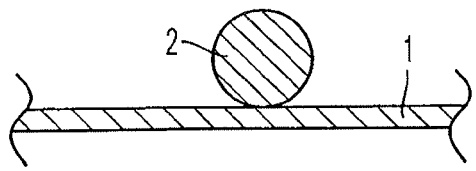
FIGS. 1 to 4 illustrate structure and steps for joining two components in accordance with an embodiment of the present invention.

FIG. 1 shows a first flat component 1, on which a male fixing element 2, which is constructed as a sphere in this case, is fastened. The sphere 2 can be connected to the first component 1 by material bonding, for example, by welding. The first component 1 may be, for example, a metal sheet; and the sphere may be a metal sphere made of the same material or made of a different material.

Figure 2:
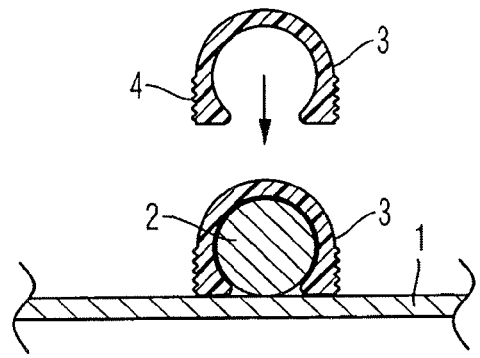

As shown in FIG. 2, a cap-like clip element 3 is snapped on the sphere 2. The clip element 3 can be made, for example, of a synthetic plastic material. This clip element has to exhibit sufficient elasticity, so that it can be snapped on the sphere 2. It is very clear from FIG. 2 that in the snapped-on state the clip element 3 engages behind the sphere 2, a feature that counteracts an unintentional removal from the sphere 2 and/or prevents the clip element 3 from sliding off the sphere by itself.

As one can see in FIG. 2, the outer periphery of the clip element 3 is provided with a circumferential tooth-like profiling 4. The profiling does not have to extend necessarily over the entire outer periphery of the clip element 3. Said profiling can also be provided in sections only in defined regions.

A second component 5, which has a female fixing element that is constructed as a circularly round hole 6 in the exemplary embodiment depicted herein, can be clipped on the clip element 3, which is snapped on the sphere 2, in an insertion direction 7.

Since the clip element 3 exhibits a certain amount of oversize with respect to the inner diameter of the hole 6 in directions that are perpendicular to the insertion direction 7, the result is a clamping force between the clip element 3 and the inner circumference of the hole 6 when the two components 1, 5 are plugged together, so that the two components 1, 5 can be clamped to each other.

Figure 3:
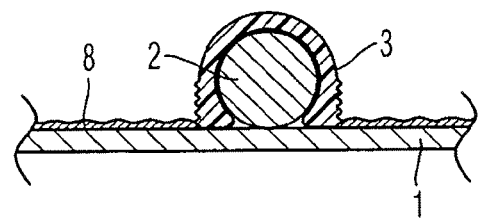
Figure 4:
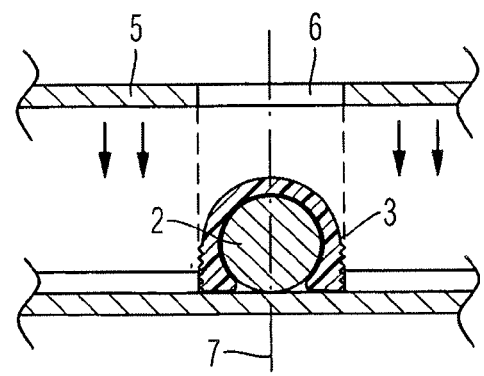

As indicated in FIG. 3, the two components 1, 5 can also be adhesively cemented to each other by means of an adhesive layer 8. As an alternative to an adhesive bonding, the two components 1, 5 can also be permanently and securely connected to each other in other ways, for example, by welding, in particular remote laser welding, by screwing, riveting or in any other way.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A component connection arrangement, comprising:
a first component having a male fixing element projecting from a surface of the first component, the male fixing element being a spherical non-resilient male fixing element;
a clip element configured to be located on the male fixing element in at least one of a friction-locking manner and a positive-locking manner, the clip element being at least one of elastically and plastically deformable; and
a second component on the clip element having a female fixing element at least one of in and on the second component and configured to engage the clip element,
wherein in a connected state the clip element is located between the male fixing element and the female fixing element, and
the clip element is a cap configured to completely cover the male fixing element and extend up to and rest against a side of the first component facing the second component.

2. The component connection arrangement according to claim 1, wherein a spherical surface portion of the spherical non-resilient male fixing element is welded directly to the first component.

3. A method for connecting components, comprising the acts of:
providing a first component having a male fixing element projecting from a surface of the first component;
providing a clip element on the male fixing element; and
providing a second component on the clip element,
wherein the clip element is connected to the male fixing element in at least one of a friction-locking manner and a positive-locking manner, is located between the male fixing element and a female fixing element at least one of in and on the second component, the clip element engages behind the male fixing element in a positive-locking manner, and the clip element is a cap configured to completely cover the male fixing element and extend up to and rest against a side of the first component facing the second component.

4. The component connection method as claimed in claim 3, wherein the clip element is oversized with respect to the female fixing element in at least one direction transverse to an insertion direction along which the male fixing element is inserted into the female fixing element, the transverse direction extending through the male fixing element.

5. The component connection method as claimed in claim 4, wherein the clip element is made of a synthetic plastic material.

6. The component connection method as claimed in claim 5, wherein a profiling is provided on an outer periphery of the clip element.

7. The component connection method as claimed in claim 6, wherein the profiling is a toothed profile.

8. The component connection method as claimed in claim 7, wherein on insertion into the female fixing element, the clip element is deformed at least one of elastically and plastically at least in one outer region.

9. The component connection method as claimed in claim 3, wherein the male fixing element has at least a partially spherical shape.

10. The component connection method as claimed in claim 3, wherein the male fixing element is fixed to the first component by material bonding.

11. The component connection method as claimed in claim 10, wherein the male fixing element is welded to the first component.

12. The component connection method as claimed in claim 3, wherein the first component and the second component are made of different materials.

13. The component connection method as claimed in claim 12, wherein the first component is a metal component.

14. The component connection method as claimed in claim 13, wherein the first component is made of at least one of steel and aluminum.

15. The component connection method as claimed in claim 13, wherein the second component is made of a synthetic plastic material.

16. The component connection method as claimed in claim 15, wherein the second component is a fiber-reinforced synthetic plastic material that includes at least one of carbon fibers and glass fibers.

17. The component connection method as claimed in claim 3, wherein the male fixing element is made of the same material as the first component.

18. The component connection method as claimed in claim 3, wherein the first component and the second component are further connected by material bonding.

19. The component connection method as claimed in claim 18, wherein the material bonding of the first component and the second component is by at least one of welding and adhesive cementing.

20. The component connection method as claimed in claim 3, wherein at least one of the first component and the second component is a vehicle component.

21. The component connection method as claimed in claim 20, wherein at least one of the first component and the second component is a vehicle body component.

* * * * *